UNITED STATES PATENT OFFICE.

CARL ALBERT KERN, OF MILL VALLEY, CALIFORNIA.

PROCESS OF PRESERVING FRUIT-JUICES.

1,204,880. Specification of Letters Patent. Patented Nov. 14, 1916.

No Drawing. Application filed June 28, 1915. Serial No. 36,635. REISSUED

*To all whom it may concern:*

Be it known that I, CARL ALBERT KERN, a citizen of the United States, and a resident of Mill Valley, Marin county, State of California, have invented a new and useful Process of Preserving Fruit-Juices, of which the following is a specification.

The invention relates to a process of preserving fruit juices.

An object of the invention is to preserve fruit juices without changing the natural state or condition of the contents or flavors of the juices.

Another object of the invention is to preserve fruit juices in a dry state.

The invention possesses other advantageous features, some of which, with the foregoing, will be set forth at length in the following description, where I shall outline in full one form of carrying out the process of my invention. It is to be understood, however, that the precise method outlined herein is merely the preferable form of carrying out the invention and that I do not limit myself to such form.

In accordance with my invention, the fresh fruit juices which have been extracted from the fruit by pressure or similar means are filtered to remove any fruit particles and the moisture in the juices is removed by evaporation. The evaporation is continued until the juices are reduced to the consistency of syrup. To the syrup I add a quantity of cellulose material, such as paper pulp, and heat the mixture gently to dryness. The cellulose material is sterile and is not decomposed by the evaporated fruit juices and the amount of cellulose material added is preferably from 1% to 2% of the original amount of fruit juice.

In its dry state, the fruit juice can be kept for any length of time, can be easily stored or transported and retains its original flavor. When the fruit juice is to be used the evaporated amount of water is added to the dry material to dissolve the dried juice and the cellulose material is removed from the liquid by straining or otherwise. The strained liquid contains the fruit juice in its natural content and flavor.

I claim:

1. The process of preserving fruit juice, which consists in evaporating the juice to the consistency of syrup, adding cellulose material thereto and evaporating the mixture to dryness.

2. The process of preserving fruit juice so that it may be recovered in its original state, which consists in adding cellulose material to the juice and evaporating to dryness.

3. The method of preserving fruit juice, which consists in evaporating the juice to the consistency of syrup, adding thereto a sterile material which is not decomposed by the evaporated juice, and slowly drying the mixture.

4. The process of preserving fruit juice, which consists in adding to the juice a material which is not acted on by the juice to produce water soluble compounds and evaporating the mixture to dryness.

In testimony whereof I have hereunto set my hand at San Francisco, California, this 22nd day of June, 1915.

CARL ALBERT KERN.

In presence of—
H. G. PROST.